United States Patent Office 3,060,619
Patented Oct. 30, 1962

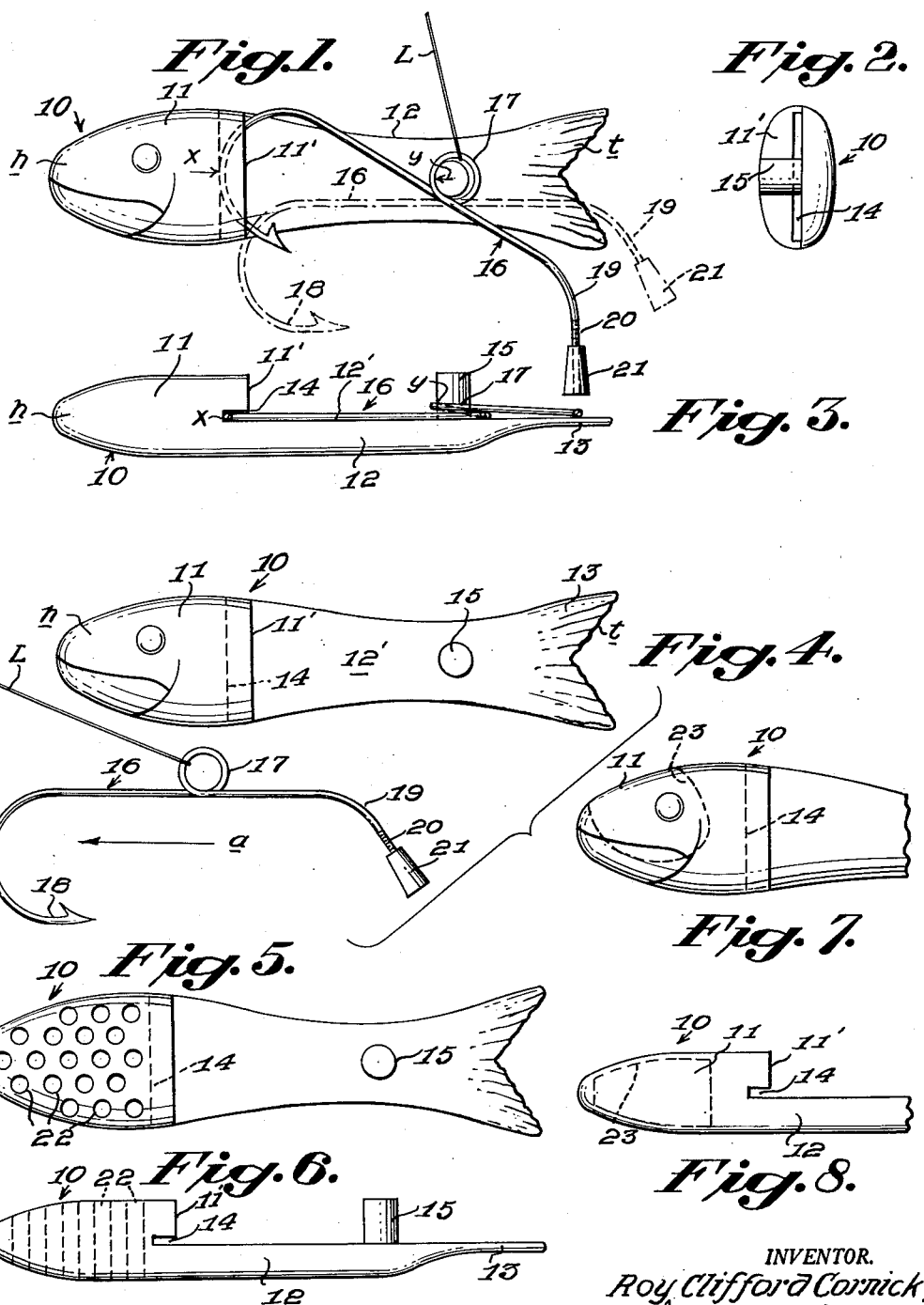

3,060,619
FISH LURE
Roy Clifford Cornick, 717 Sheridan St., Albert Lea, Minn.
Filed Aug. 10, 1960, Ser. No. 48,673
3 Claims. (Cl. 43—35)

This invention relates to a fish lure.

The invention is more particularly concerned with a fish lure which is characterized by a plug-type body and a complemental hook having releasable connection with the body for ready removal therefrom upon striking of the lure by a fish.

A primary object of the invention is to provide a fish lure comprising an inexpensive disposable lure body member simulating a minnow, or other well known form of artificial bait, together with a hook member releasably engaged with the body member and wherein the hook is normally substantially concealed from contact thereof by a fish and wherein the hook member includes a shank portion protruding from the lure body member which is engageable by the fish for moving the hook member into range of the fish.

A further object of the invention is to provide a fish lure characterized by an inexpensive and disposable lure body member simulating a minnow, or other well known form of artificial bait, together with a releasable hook member having the shank portion thereof pivotally connected to the body member and the hook thereof normally substantially concealed by the body member, together with a tail portion normally depending from the lure body and which upon contact thereof by a fish swings the hook into range of the fish and out of concealed engagement with the body member.

A still further object of the invention is to provide a fish lure of the general character as above referred, wherein the combined body member and hook member are substantially balanced for horizontal floating action in the water and wherein the said tail portion is provided with adjustable means for correcting any unbalanced position of the body member and hook member.

Other objects and advantages of the invention will become apparent in the course of the following detailed description, taken in connection with the accompanying drawing, wherein—

FIG. 1 is a side elevational view of the improved lure wherein the line attached hook is removably supported by the disposable lure body in a position for a casting operation of the lure.

FIG. 2 is a rear end elevational view of the disposable lure body.

FIG. 3 is a bottom plan view of the structure of FIG. 1 with the hook partially in section.

FIG. 4 is a composite side elevational view showing the line attached hook released from the disposable lure body, as is occasioned upon a strike by a fish.

FIG. 5 is a side elevational view of the lure body in a modified embodiment thereof.

FIG. 6 is a bottom plan view of the lure body of FIG. 5.

FIG. 7 is a partial side elevational view of the lure body in accordance with a further modified embodiment thereof.

FIG. 8 is a bottom plan view of the fragmental lure body of FIG. 7.

Referring now in detail to the drawing, and first to FIGS. 1 to 4 thereof, the lure will be seen to comprise a disposable lure body 10 which may be of plastic or any other desirable material and which comprises a head portion 11, a mid body portion 12 and a tail portion 13.

As is more clearly shown in FIGS. 3 and 6, the head portion 11 is substantially wider than the body portion 12 in the provision of a shoulder 11' which is disposed normal to a plane surface 12' of the body portion 12 and the tail 13 and which surface is disposed intermediate the opposite sides of the head portion 11.

A vertically disposed notch or slot 14 is formed in the body 10 and which extends into the head portion 11 with one side wall thereof being flush with the said plane surface 12'.

The body is further provided with a cylindrical lug 15 which projects laterally from the surface 12' and is disposed intermediate the slot 14 and the free tail end 13 of the lure body.

The body, as above described, is adapted to releasably support a hook shank 16 which is provided intermediate its ends with a coiled eye 17. The hook shank 16 is further provided with an arcuate hook portion 18 at one end thereof and the opposite end portion of the shank 16 is bent as at 19 beyond which is a relatively short straight threaded terminal portion 20 on which is adjustably supported a weight 21 for maintaining the combined body and hook member in horizontal equilibrium while in the water.

The disposable lure body 10 is shown in the form of a minnow having a head $h$ and a tail $t$, the latter of which together with the intermediate portion 12, is flat on one side to accommodate the hook shank 16, the remaining surfaces of the lure being rounded to simulate artificial bait. It is, however, to be understood that the lure body may be in the form of other well known bait so long as the body is provided with the hook supporting means shown in FIG. 1.

As is indicated in FIGS. 5 and 6, the head portion 11 of the lure body may be provided with a plurality of transversely disposed through apertures 22 for receiving scented bait for greater attraction of fish to the lure body.

According to FIGS. 7 and 8, the said head portion 11 may be provided with a relatively large chamber or recess 23 for receiving the said scented bait.

In use of the improved lure, the hook is initially disposed, as shown in solid lines in FIG. 1, wherein the arcuate hook portion 18 frictionally engages the bottom wall of the notch 14 as at $x$, and the adjacent portion of the eye 17 frictionally engages the lug 15 as at $y$, with both points of frictional engagement being substantially in the longitudinal axis of the lure body.

In this set position of the hook shank, the weighted end thereof is disposed substantially below the lure body 10 and the hook is substantially concealed.

Thus, upon a strike by a fish, the weighted end of the hook shank through impact by a fish will be thrown upwardly with a resulting downward movement of the hook portion 18 into the range of a striking fish, as is indicated in dotted lines in FIG. 1.

In the latter position of the hook, friction at points $x$ and $y$ will have been overcome and the hook 16 supported by line L will be free of the disposable lure body 10 which is lost in the fishing water.

The hook, however, when removed from the captured fish may be applied as in FIG. 1 on another lure body and since the bodies are capable of manufacture at relative low cost, little expense will be incurred in the disposal thereof.

With the structure shown here, it is possible to have only one fish hook in a bait box and a number of artificial lures or bodies of different shapes and colors, rather than a number of bodies each having hooks permanently attached thereto which become entangled with one another.

Having set forth the invention in accordance with a preferred structural embodiment thereof, what is claimed and desired to be secured by U.S. Letters Patent is:

1. A fish lure comprising a disposable body member in simulation of a minnow or other artificial bait, the body member comprising a head portion of generally elliptical cross section and a body portion having a flat vertical wall whose plane substantially bisects said head portion, there being a vertical slot in said head portion opening toward said body portion, a pivot lug projecting outwardly from said flat wall in spaced relation to said slot, a hook member comprising an elongated shank having an eye intermediate its ends removably engaged with said lug for pivotal movement thereon, said shank having a curved hook at one end thereof normally disposed within said slot out of range of a striking fish, and the opposite end of said shank being normally disposed beneath said body member for engagement thereof by a striking fish with a resulting pivotal action of said shank for positioning said hook member into range of the striking fish.

2. A fish lure according to claim 1, wherein said opposite end of said shank is threaded, and a weight adjustably supported on said threaded end for the purpose set forth.

3. A fish lure according to claim 1, wherein said head portion is provided with a recess.

References Cited in the file of this patent

UNITED STATES PATENTS

| | | |
|---|---|---|
| 497,962 | D'Ivernois | May 23, 1893 |
| 1,173,694 | Witty | Feb. 29, 1916 |
| 1,381,003 | Pierson | June 7, 1921 |
| 1,920,991 | Lahm | Aug. 8, 1933 |
| 2,097,221 | Babbitt | Oct. 26, 1937 |
| 2,474,481 | Kleppen | June 28, 1949 |
| 2,589,715 | Lysikowski | Mar. 18, 1952 |
| 2,598,011 | Pitre | May 27, 1952 |
| 2,640,292 | Nadolny | June 2, 1953 |
| 2,729,014 | Johnson | Jan. 3, 1956 |
| 2,793,459 | Multanen | May 28, 1957 |
| 2,797,517 | Eriksen | July 2, 1957 |

FOREIGN PATENTS

| | | |
|---|---|---|
| 998,875 | France | Sept. 26, 1951 |